US010628573B2

(12) United States Patent
Gibbs et al.

(10) Patent No.: US 10,628,573 B2
(45) Date of Patent: Apr. 21, 2020

(54) SYSTEMS AND METHODS FOR TRACKING USERS OF WEARABLE DEVICES

(71) Applicant: Walmart Apollo, LLC, Bentonville, AR (US)

(72) Inventors: Cathy Gibbs, Bentonville, AR (US); Christopher Soames Johnson, Pea Ridge, AR (US); Kathleen Elizabeth Pearson, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/511,842

(22) Filed: Jul. 15, 2019

(65) Prior Publication Data
US 2019/0340346 A1 Nov. 7, 2019

Related U.S. Application Data

(63) Continuation-in-part of application No. 15/708,826, filed on Sep. 19, 2017, now abandoned.

(60) Provisional application No. 62/397,146, filed on Sep. 20, 2016.

(51) Int. Cl.
| | |
|---|---|
| *G06F 21/34* | (2013.01) |
| *G06Q 10/06* | (2012.01) |
| *G06K 19/077* | (2006.01) |
| *G07C 9/00* | (2020.01) |
| *G06Q 10/10* | (2012.01) |
| *H04W 4/80* | (2018.01) |

(52) U.S. Cl.
CPC ....... *G06F 21/34* (2013.01); *G06K 19/07762* (2013.01); *G06Q 10/0639* (2013.01); *G06Q 10/06311* (2013.01); *G06Q 10/1097* (2013.01); *G07C 9/00111* (2013.01); *H04W 4/80* (2018.02)

(58) Field of Classification Search
CPC ................................ G06F 21/34; H04W 4/80
USPC ........................................................ 340/5.2
See application file for complete search history.

(56) References Cited

U.S. PATENT DOCUMENTS

| | | |
|---|---|---|
| 6,226,622 B1 | 5/2001 | Dabbiere |
| 6,700,493 B1 | 3/2004 | Robinson |
| 8,149,126 B2 | 4/2012 | Little et al. |
| | (Continued) | |

FOREIGN PATENT DOCUMENTS

| | | |
|---|---|---|
| CN | 202939420 U | 5/2013 |
| CN | 103810764 A | 5/2014 |

OTHER PUBLICATIONS

Zenk-Batsford, et al., Wearable Technology in the Manufacturing Workplace, http://www.manufacturing.net/article/2014/06/wearabletechnologymanufacturingworkplace, last viewed Apr. 21, 2016.

(Continued)

*Primary Examiner* — Vernal U Brown
(74) *Attorney, Agent, or Firm* — McCarter & English, LLP; David R. Burns

(57) ABSTRACT

Exemplary embodiments of the present disclosure are related to a distributed system in which wearable devices communicate with computing systems to implement one or more actions or operations and sensor data transmitted by the wearable devices to the computing systems can be utilized to determine information about tasks being performed by the wearers of the wearable devices after consent is given and verified. Embodiments of the distributed system can include the wearable devices, wireless receivers (or transceivers), and a computing system.

16 Claims, 7 Drawing Sheets

(56) References Cited

U.S. PATENT DOCUMENTS

| | | |
|---|---|---|
| 2002/0183979 A1 | 12/2002 | Wildman |
| 2008/0109895 A1 | 5/2008 | Janevski |
| 2008/0238667 A1 | 10/2008 | Olson |
| 2009/0322513 A1 | 12/2009 | Hwang et al. |
| 2011/0215911 A1 | 9/2011 | Cassels et al. |
| 2012/0161971 A1 | 6/2012 | Nasir et al. |
| 2013/0231574 A1 | 9/2013 | Tran |
| 2014/0279528 A1 | 9/2014 | Slaby et al. |
| 2015/0058942 A1 | 2/2015 | Dermu |
| 2015/0199641 A1 | 7/2015 | Napoli |
| 2015/0379791 A1 | 12/2015 | Russell et al. |
| 2016/0012545 A1 | 1/2016 | Amigo et al. |
| 2016/0078180 A1 | 3/2016 | Stackpole et al. |
| 2016/0125348 A1 | 5/2016 | Dyer et al. |

OTHER PUBLICATIONS

International Search Report and Written Opinion from related International Patent Application serial No. PCT/US2017/052168 dated Nov. 24, 2017.

SYSTEMS AND METHODS FOR TRACKING USERS OF WEARABLE DEVICES

CROSS-REFERENCE TO RELATED PATENT APPLICATIONS

This application is a continuation-in-part of U.S. patent application Ser. No. 15/708,826, filed on Sep. 19, 2017, which claims priority to U.S. Provisional Application No. 62/397,146 filed on Sep. 20, 2016, the content of each are hereby incorporated by reference in its entirety.

BACKGROUND

In large distributed environments, it can be difficult to track resources and to determine how such resources are being utilized.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
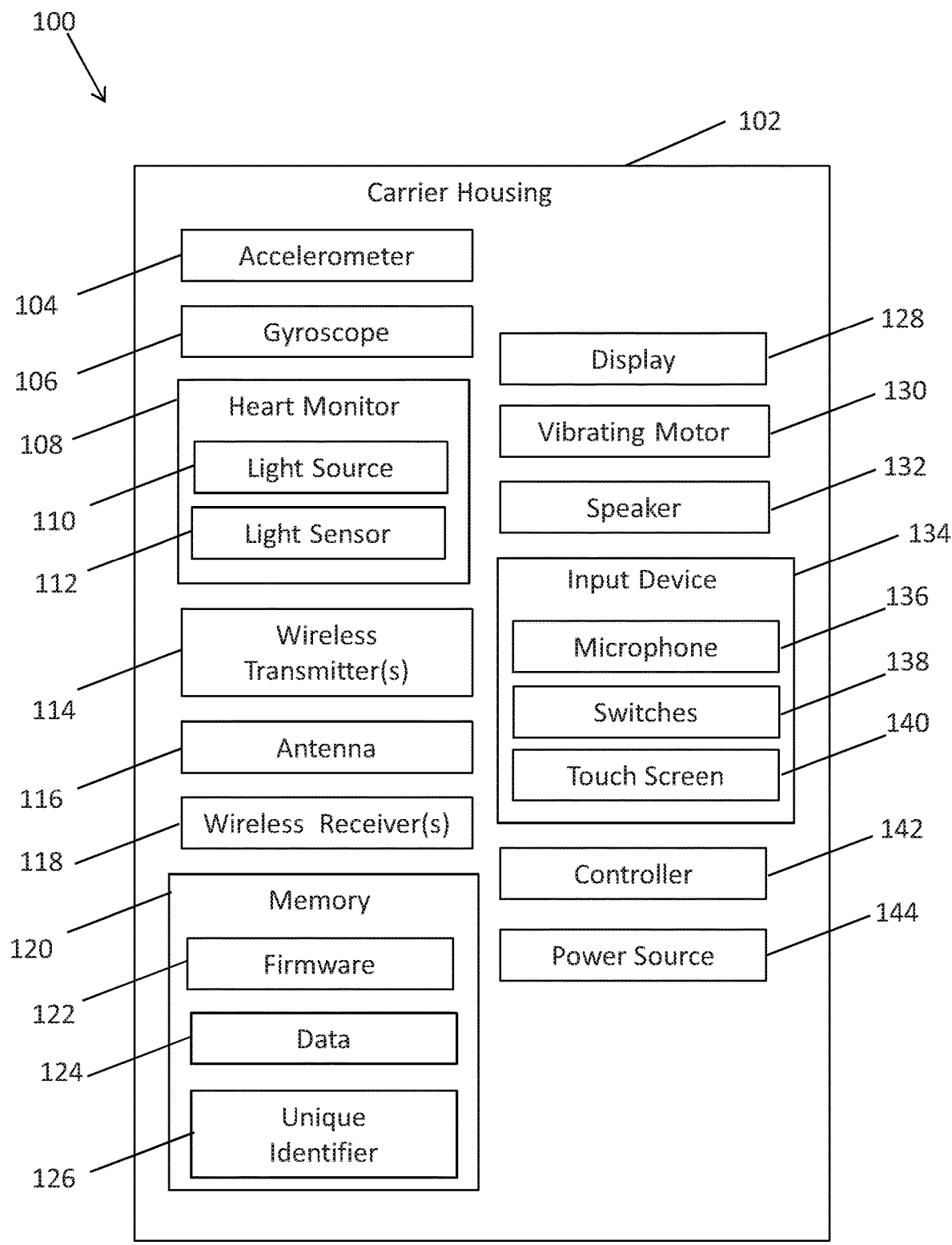
FIG. 1 is a block diagram of an exemplary wearable device in accordance with embodiments of the present disclosure.

Exemplary embodiments of the present disclosure are related to a distributed system in which wearable devices communicate with computing systems to implement one or more actions or operations and sensor data transmitted by the wearable devices to the computing systems can be utilized to determine information about tasks being performed by the wearers of the wearable devices. Embodiments of the distributed system can include the wearable devices, wireless receivers (or transceivers), and a computing system.

Exemplary embodiments of the systems, methods, and computer readable media described herein can be configured to comply with privacy requirements which may vary between jurisdictions. For example, before any recording, collection, capturing or processing of user biometric data, a "consent to capture" process may be implemented. In such a process, consent may be obtained, from the user, via a registration process. Part of the registration process may be to ensure compliance with the appropriate privacy laws for the location where the service would be performed. The registration process may include certain notices and disclosures made to the user prior to the user recording the user's consent. No unauthorized collection or processing of biometric data of individuals occurs via exemplary systems and methods.

After registration, and before collection or processing of biometric data of the user occurs, a verification of the user as registered with the system and providing the required consents can occur. That is, the user's registration status as having consented to the collection of biometric data can be verified prior to collecting any biometric data. This verification can take place, for example, by the user entering a PIN (Personal Identification Number), password, or other code into a user interface or input device(s) of the wearable device or another device; by the user entering into a limited geofence location while carrying the wearable device(s), a fob, mobile device (such as a smartphone), or other RF transmitter, where the device has been configured to broadcast an authorization signal.

Once consent is verified, biometric data of the user can be captured, processed and used. Absent verification of consent of the user, the wearable device(s), sensor, or other biometric data collection system remains turned off or inactive with respect to the user. Once consent of the user is verified, the wearable device(s), sensor, or other biometric data collection system may be activated or turned on with respect to the user. If any biometric data is inadvertently collected from the user prior to verification of consent it is immediately deleted by exemplary embodiments of the present disclosure, not having been saved to disk.

Preferably, any biometric data captured as part of the verification process is handled and stored by a single party at a single location. Where data must be transmitted to an offsite location for verification, certain disclosures prior to consent may be required, and the biometric data is encrypted. The hashing of the biometric data received is a form of asymmetrical encryption which improves both data security and privacy, as well as reducing the amount of data which needs to be communicated. Unless otherwise stated herein, the description of exemplary embodiments of the present disclosure is described assuming consent was given by the users and the consent was verified before any data was collected.

Each of the wearable devices can include a carrier housing, such as a wristband, that can be worn by a user. The carrier housing can house an accelerometer, a wireless transmitter, wireless receiver, and a controller, which can be configured to receive acceleration data from the accelerometer and to wireless transmit the acceleration data and a unique identifier. The acceleration data transmitted by a wearable device can be raw acceleration data and/or can be processed acceleration data. For example, the raw acceleration data can be accelerations sensed by the accelerometer with respect x, y, and z components of the acceleration and processed acceleration data can include a quantity of steps taken by the wearer of the wearable device.

The wireless receivers (or transceivers) can be geographically distributed throughout a facility, and can be configured to receive the acceleration data and unique identifiers transmitted by the wearable devices. For example, a wearable device can transmit acceleration data and a unique identifier associated with the wearable device and the wireless receivers within range of the transmission from the wearable device can receive the acceleration data and the unique identifier, while the wireless receivers that are not in range of the transmission do not receive the transmission. A location of the wearable device can be determined based on which of the wireless receivers receive the transmission from the wearable device and/or based on the signal strength of the transmission when the wireless receivers receive the transmission.

The computing system can be in communication with the wireless signal receivers and can be configured to receive the transmissions from the wearable devices via the wireless signal receivers. In response to receiving the acceleration data and unique identifier information, the computing system can perform one or more actions or operations. As one example, the computing system can determine that the user of the wearable device has arrived at a location and can set a memory location in a storage device to indicate that the user has arrived at the location and/or can determine that the user of the wearable device has departed from a location and can set a memory location in a storage device to indicate that the user has departed from the location. As another example, the computing system can initiate a multi-factor authentication process using the unique identifier as one factor for authenticating the user before allowing the user to access and operate one or more electronic terminals. Other factors that can be used in the multi-factor authentication process can be, for example, a password, reading a machine-readable element or a magnetic stripe including a unique identifier that is different than the unique identifier transmitted by the wearable device, and like. As another example, the computing system can be configured to determine a task being performed by the wearer of the wearable device, a status of the task being performed by the wearer of the wearable device (e.g., started, in process, completed), and/or other parameters associated with tasks being performed by the wearer of the wearable device.

In exemplary embodiments, a wearable device can be worn by an associate/employee and can be used to "clock-in" the employee as the employee enters a facility (e.g., based on receipt of a wireless transmission from a wearable device by a wireless signal receive disposed in proximity to an entrance of the facility. Receipt of the transmission from the wearable device by a wireless signal receiver can also be used to log the employee into computing devices that the employee will use during the work shift (e.g., electronic terminals, portable device, etc.). For example, an employee enters the facility wearing a wearable device and can be automatically logged into a timekeeping system that shows the employee as present and logged onto the clock for their shift in response to detecting the wearable device. Receipt of the acceleration data can also be used to track a relative location of the wearer and the physical steps taken by the wearer. For example, the quantity of steps taken by an employee wearing the wearable device can be monitored and tallied for a task being performed by the employee, and this information can be used to determine how the movement of the employee throughout the facility can be modified to improve performance.

In exemplary embodiments, during the time an employee is clocked in, until the employee clocks out and departs from the facility after their shift, and after consent is verified, the distributed system can be used to track an attendance, a location of the employee, and a quantity of steps taken by the employee as the employee is assigned tasks, which can be used to determine where throughout the shift wasted steps are taken by the employee. By tracking the location, the task, and the quantity of steps that a task should take (while averaging that task's time to completion for a given time period), the computing system can determine that an employee was taking too long to complete a task and/or can identify appropriate employees for tasks requiring different levels of physical exertion, determine which employees should be given more or less tasks during a shift, and/or generate paths in the facility that the wearer of the wearable device should follow to complete tasks more efficiently and timely. In some embodiments, the paths generated by the computing system can be dependent on a frequency of the task and a number of steps required for completion. For example, a location and quantity of steps of the wearer of a wearable device can be tracked as the wearer performed a task (e.g., unloading trucks from the back, bringing pallets to unload to the front of the store and unloading and facing stock), and the computing system can use this data to determine the shortest path for the associate to travel when certain item types (e.g. dairy or electronics) arrive and ultimately how, where and when items are placed onto shelves.

In exemplary embodiments, the distributed system can add user-specific reminders to the wearable devices. Reminders programmed into the wearable devices can cause the wearable devices to vibrate. As an example, the computing system can load a reminder onto a wearable device such that when the wearer's break time is due, the wearable device can vibrate to alert the wearer that it is time for the wearer to take a break. In exemplary embodiments, certain vibration patterns can be programmed into the wearable devices. For example, when a specific vibration pattern can be used to alert a wearer, with the least amount of steps taken for an identified period of time as compared to other wearers, that the next available task for unloading a specific pallet will be assigned to him/her.

By tracking and calculating the location and number of steps taken for a particular task, for all wearers of the wearable device in a facility, the computing system can determine what tasks each wearer is working on. After identifying the tasks being performed, the computing system can aggregate the number of steps taken for each wearer and determine a status of the task (e.g., how deep the wearers are into their respective tasks). When a new unplanned task needs to be added (e.g., a customer request or happenstance that needs attention), based on the tracked location, number of steps, and status of tasks, the computing system can identify which wearer of the wearable device should be identifier for performing the unplanned task, and can add the new task to the wearer's task. In some embodiments, new tasks can be added to the wearer's task based on a proximity to the location at which the task is to be performed and a status of their current prioritized tasks. In some embodiments, the computing system can notify a manager (e.g., via a portable device carried by the manager or a wearable device worn by the manager) of the unplanned task and which wearer should be assigned to the unplanned task. If a wearer is reassigned to an unplanned task while performing another task, another wear of a wearable device can be assigned to complete the task in order of priority. In some embodiments, a message can be sent to the wearer to be assigned a new task.

In exemplary embodiments, messages can be sent from to and from wearable devices. As one example, a facility can include a customer interface that allows a customer to post a question or a request to wearers of the wearable devices in the facility and one or more of the wearers can respond to the question (e.g., either by posting an answer to the customer interface or by moving to the customer's location). In some embodiments, in response to the post or request, the computer perform analytics on each wearer of the wearable device to determine their current location and a status of the tasks being performed by the wearers, and based on this analysis, the computing system can identify which of the wearer should receive a message via their wearable device to move to the location of the customer and assist the customer.

FIG. 1 is a block diagram of an exemplary wearable device 100 in accordance with embodiments of the present disclosure. The wearable device 100 can include a wearable carrier housing 102 configured to be worn by a human. For example, the wearable carrier housing 102 can be a wristband configured to be worn around a human's wrist. Electronic circuitry can be housed by the wearable carrier housing 102. For example, the wearable carrier housing 102 can house an accelerometer 104, gyroscope 106, a heart monitor 108, a wireless transmitter 114, antenna 116, a wireless receiver 118, memory 120, a display 128, a vibrating motor 130, a speaker 132, one or more input devices 134, a controller 142, and power source 144. The wearable device 100 can be configured to monitor one or more metrics associated with a wearer of the wearable device 100, to transmit the metric and a unique identifier associated with the wearable device 100, and/or receive data from one or more sources.

The accelerometer 104 can sense accelerations with respect to one or more axes of the accelerometer and generated acceleration data corresponding to the sensed accelerations. For example, the accelerometer 104 can be a multi-axis accelerometer including x, y, and z axes and can be configured to sense accelerations with respect to the x, y, and z axes of the accelerometer. The acceleration data generated by the accelerometer 104 can be used to determine one or more metrics associated with the wearer of the wearable device 100. For example, the acceleration data generated by the accelerometer 104 can be used to determine a quantity of steps the wearer of the wearable device has taken over time.

The accelerometer 104 can output acceleration data corresponding to each axes of measurement and/or can output one or more signals corresponding to an aggregate or combination of the three axes of measurement. For example, in some embodiments, the accelerometer 104 can be a three-axis or three-dimensional accelerometer that includes three outputs (e.g., the accelerometer can output x, y, and z component data). The accelerometer 104 can detect and monitor a magnitude and direction of acceleration, e.g., as a vector quantity, and/or can sense an orientation, vibration, and/or shock. In some embodiments, a gyroscope 106 can be used instead or in addition to the accelerometer 104, to determine an orientation of wearable device 100. In some embodiments, the orientation of the wearable device 100 can be used to aid in determining whether the acceleration data corresponds to a step taken by a wearer.

The heart monitor 108 can be configured to sense a heartbeat of the wearer of the wearable device. Embodiments of the heart monitor 108 can include a light source 110 and a light sensor 112, where the light source 110 emits light towards a wearer (e.g., towards a wearers wrists) and the light can be reflected from the wearers wrist (e.g., based on a rate at which the blood pulsating through the wrist of the wearer). Based on receiving the reflected light by the light sensor 112, the heart monitor 108 can generate and output heartbeat data.

The wireless transmitter 114 can be configured to transmit wireless transmissions via an antenna 116. For example, the wireless transmitter 114 can be configured to transmit one or more messages, directly or indirectly, to one or more electronic devices. The wireless transmitter 114 can be configured to transmit messages at a specified frequency and/or according to a specified sequence and/or packet arrangement. As one example, the wireless transmitter 114 can be a radiofrequency transmitter. In some embodiments, the wireless transmitter can be configured to transmit radio transmissions in the frequency range of approximately 2.4 gigahertz (GHz) to approximately 5.6 GHz.

The wireless receiver 118 can be configured to receive wireless transmissions via the antenna 116. For example, the wireless receiver 118 can be configured to receive one or more messages, directly or indirectly, from one or more electronic devices. The wireless receiver 118 can be configured to receive messages at a specified frequency and/or according to a specified sequence and/or packet arrangement. As one example, the wireless receiver 118 can be a radiofrequency receiver. In some embodiments, the wireless receiver can be configured to receive radio transmissions in the frequency range of approximately 2.4 gigahertz (GHz) to approximately 5.6 GHz.

The memory 120 can include any suitable, non-transitory computer-readable storage medium, e.g., read-only memory (ROM), erasable programmable ROM (EPROM), electrically-erasable programmable ROM (EEPROM), flash memory, and the like. The memory 120 can store firmware 122 and data 124 for use by the wearable device 100. In exemplary embodiments, the firmware 122 can be embodied as computer-readable/executable program code stored in the memory 120 and can be implemented using any suitable, high or low level computing language and/or platform, such as, e.g., Java, C, C++, C#, assembly code, machine readable language, and the like. The data 164 can include the acceleration data, the heartbeat data, and/or any other suitable data associated with the wearer or the output of the sensors (e.g., the accelerometer 104 and heart monitor 108) included in the wearable device 100. The memory 120 can also store a unique identifier 126 that can be used to distinguish transmissions from the wearable device 100 from transmission from other wearable device 100 and/or to determine transmissions that are intended for the wearable device 100.

The display 128 can be integrated with the wearable carrier housing 102 and can be configured to render data/information to be viewed by the wearer. For example, the display can render messages, tasks, a heartrate, a quantity of steps taken, a graphical user interface allowing the wearer to enter data/information, and the like. The screen can include a touch-sensitive screen integrated therewith to allow the wear to control the wearable device 100 via gestures or movements traced on the touch-sensitive screen. In exemplary embodiments, the display 128 can be implemented as a light emitting diode (LED) display.

The vibrating motor 130 can be configured such that when the motor is energized, the motor operates to generate vibrations. The vibrations can be felt by the wearer of the wearable device 100 to provide indications to the wearer. The vibrating motor 130 can be controlled to generate different vibrations and/or vibration patterns to generate different indicators (e.g., different amplitudes of vibration, different frequencies of vibration, different quantities of pulses of vibrations, etc.).

The speaker 132 can be configured to output audible sound. For example, the speaker can be configured to output messages, tasks, a current heartrate of the wearer, a current number of steps taken by a wearer for a particular time period or assigned task, and/or to communicate any other suitable data/information to the wearer of the wearable device 100. In some embodiments, the wearable device 100 may not include the display 128. In such embodiments, communications from the wearable device 100 to the wearer may be limited to vibrations from the vibrating motor 130 and/or audible sounds output by the speaker 132.

The one or more input devices 134 can be configured to allow the wearer of the wearable device 100 to input data/information into the wearable device 100. Examples of input devices can include a microphone 136, one or more buttons/switches 138, the touch sensitive screen 140 integrated with the display 128, and the like. The microphone 136 can allow the wearer to interact with the wearable using voice commands or message.

The controller 142 can be operatively coupled to the accelerometer 104, the gyroscope 106, the heart monitor 108, the wireless transmitter 114, the wireless receiver 118, the memory 120, the display 128, the vibrating motor 130, the speaker 132, and the one or more input devices 134. The controller 142 can execute the firmware 122 in the memory 120 to perform one or more operations to facilitate one or more processes described herein. For example, in exemplary embodiments, the controller 142 can be programmed to execute the firmware 122 to receive and process information/data from the accelerometer 104 (e.g. X, Y, Z data), the gyroscope 106, the heart monitor 108, the wireless receiver 118, the memory 120 and/or can be programmed to output information/data to the wireless transmitter 114, the memory 120, and/or the display 128 based on the execution of the firmware 122. As one example, the controller 142 can receive information/data (e.g., acceleration data) from the accelerometer 104 corresponding to a direction force along one or more of the axes of the accelerometer 104, and can transmit the acceleration data via the wireless transmitter. As another example, the controller 142 can receive information/data from the accelerometer 104 corresponding to a direction force along one or more of the axes of the accelerometer 104, can process the information/data to determine whether the acceleration data corresponds to one or more steps taken by the wearer of the wearable device 100, and can transmit the quantity of steps detected via the wireless transmitter 114.

The power source 144 can be implemented as a battery or capacitive elements configured to store an electric charge, and can provide power the accelerometer 104, the gyroscope 106, the heart monitor 108, the wireless transmitter 114, the wireless receiver 118, the memory 120, the display 128, the vibrating motor 130, the speaker 132, the one or more input devices 134, and the controller 142. As one example, in some embodiments, the power source can be a button cell lithium battery. As another example, the power source 144 can be a rechargeable power source, such as a battery or one or more capacitive elements configured to be recharged via a connection to an external power supply and/or to be recharged by an energy harvesting device. As one example, the rechargeable power source can be recharged using solar energy (e.g., by incorporating photovoltaic or solar cells on the housing on the sensor module), through physical movement (e.g., by incorporating a piezo-electric elements in the sensor module), and/or through any other suitable energy harvesting techniques using any suitable energy harvesting devices.

Figure 2:
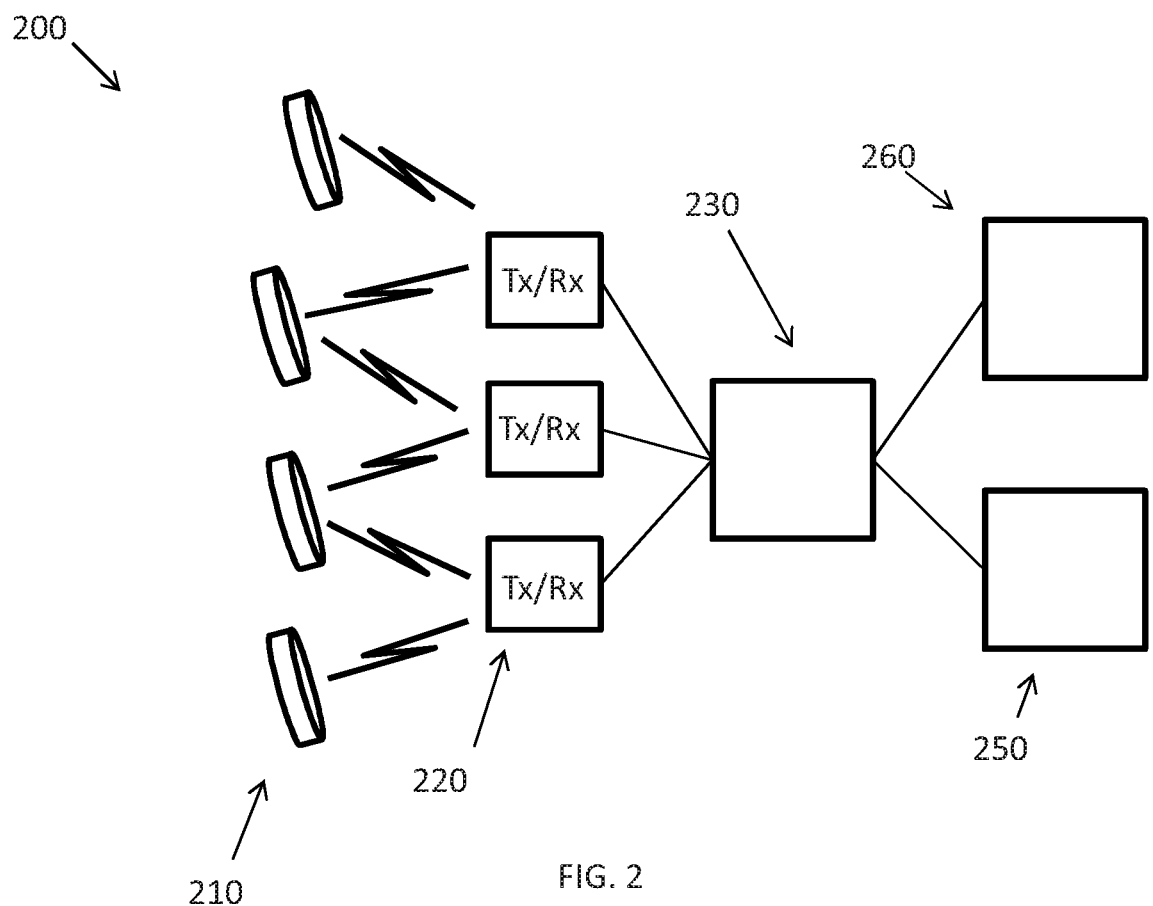
FIG. 2 is a block diagram of an exemplary distributed system utilizing embodiments of the wearable device of FIG. 1 in accordance with embodiments of the present disclosure.

FIG. 2 is a block diagram of an exemplary distributed system 200 utilizing embodiments of the wearable device of FIG. 1 to implement a user tracking and communication environment in accordance with embodiments of the present disclosure. The distributed system 200 can include wearable devices 210, wireless transceivers 220 (e.g., formed by wireless receivers and wireless transmitters), and a computing system 230. In exemplary embodiments, the wearable devices 210 can be implemented as wristbands by embodiments of the wearable devices 100.

The system 200 can be configured to comply with privacy requirements which may vary between jurisdictions. For example, before any recording, collection, capturing or processing of user biometric data, the system 200 can implement a "consent to capture" process in which consent may be obtained, from the user, via a registration process. Part of the registration process may be to ensure compliance with the appropriate privacy laws for the location where the service would be performed. The registration process may include certain notices and disclosures made to the user prior to the user recording the user's consent. No unauthorized collection or processing of biometric data of individuals occurs via exemplary systems and methods.

After registration, and before collection or processing of biometric data of the user occurs, a verification of the user as registered with the system 200 and providing the required consents can occur. That is, the user's registration status as having consented to the collection of biometric data can be verified by the system 200 prior to collecting any biometric data. This verification can take place, for example, by the users of the system 200 entering a PIN (Personal Identification Number), password, or other code into a user interface or input device(s) of the wearable devices 210 or another device; by the users entering into a limited geofence location while carrying the wearable devices 210, a fob, mobile device (such as a smartphone), or other RF transmitter, where the device has been configured to broadcast an authorization signal.

Once consent is verified, biometric data of the users can be captured, processed and used by the system 200. Absent verification of consent of the users, the wearable device(s) 210, sensor, or other biometric data collection of the system 200 remains turned off or inactive with respect to the users for which verification has not occurred. Once consent of the user is verified, the wearable device(s) 210 and/or system 200 may be activated or turned on with respect to the users for which consent has been verified. If any biometric data is inadvertently collected from the user prior to verification of consent it is immediately deleted by exemplary embodiments of the present disclosure, not having been saved to disk.

Preferably, any biometric data captured as part of the verification process is handled and stored by a single party at a single location (e.g., storage device 260). Where data must be transmitted to an offsite location for verification, certain disclosures prior to consent may be required, and the biometric data is encrypted. The hashing of the biometric data received is a form of asymmetrical encryption which improves both data security and privacy, as well as reducing the amount of data which needs to be communicated. Unless otherwise stated, the description of exemplary embodiments of the system 200 is described assuming consent was given by the users and the consent was verified before any data was collected.

The wireless transceivers 220 can include a wireless transmitter and a wireless receiver. The wireless transmitter can be configured to transmit wireless transmissions and the wireless receiver can be configured to receive wireless transmissions. As one example, the wireless transmitter can be configured to transmit one or more messages, directly or indirectly, to one or more of the wearable devices 210 and/or to the computing system 230. As another example, the wireless receiver can be configured to receive one or more messages, directly or indirectly, from one or more of the wearable devices 210 and/or from the computing system 230. The wireless transmitter and receiver can be configured to transmit and receive messages at a specified frequency and/or according to a specified sequence and/or packet arrangement. As one example, the wireless transmitter and receiver can be a radiofrequency receiver. In some embodiments, the wireless receiver can be configured to receive radio transmissions in the frequency range of approximately 2.4 gigahertz (GHz) to approximately 5.6 GHz.

The wireless transceivers 220 can be distributed throughout a facility to form a network of wireless transceivers 220 to facilitate communication with the wearable devices 210 when the wearable devices 210 are at the facility and to facilitate uninterrupted communication with the wearable devices 210 as the wearable device move throughout the facility. For example, one of the wearable device 220 can transmit acceleration data and a unique identifier, and at least one of the wireless receivers of the wireless transceivers 220 can be configured to receive the acceleration data and the unique identifier in response to the at least one of the wireless receivers of the wireless transceivers being within a transmission range of the wearable device. A location of the wearable device can be determined based on which of the wireless receivers receive the transmission from the wearable device and/or based on the signal strength of the transmission when the wireless receivers receive the transmission.

The computing system can be operatively coupled to the wireless transceivers and can be configured to receive data/information from the wireless transceivers 220 and/or to transmit data/information to the wireless transceivers for propagation to the one or more of the wearable devices 220. In exemplary embodiments, the computing system 230 can include one or more servers implemented by one or more computing devices, such as an example computing device shown in FIG. 4. The computing system 230 can be configured to execute user tracking and communication engines to perform one or more processes described herein.

In a non-limiting exemplary operation, the computing system 230 can be in communication with the wireless transceivers 220 and, after consent is verified, can be configured to receive the transmissions from the wearable devices 210 via the wireless signal receivers 220 and to receive a signal strength of the transmissions from the wearable devices 210 received by wireless transceivers 220. The wireless transmissions from the wearable devices 210 can include acceleration data and unique identifiers. In response to receiving the acceleration data and the unique identifier from one of the wearable devices 210 (e.g., via transmission from the wearable device to the computing system 230 through the wireless transceiver), the computing system 230 can determine that the user of the wearable device has arrived at a specific location in the facility and can set a memory location in a storage device 260 of the computing system to indicate that the user has arrived at the specific location and/or can determine that the user of the wearable device has departed from a specific location and can set a memory location in the storage device 260 to indicate that the user has departed from the specific location. As one example, the computing system can generate a (first) flag or parameter in a physical memory location of the storage device 260 indicating an arrival of the wearable device in response to receipt of the unique identifier through one or more of the wireless transceivers 220 disposed in proximity to entrance of the facility through which the user of the wearable device enters the facility. Based on the generation of the first flag in the memory location, the user of the wearable device can "clocked-in" to a scheduling system. As another example, the computing system can generate a second flag or parameter in a second physical memory location of the storage device 260 or can reset the first flag in the first physical memory location of the storage device 260 in response to the receipt of the unique identifier by the one or more of the wireless transceivers disposed in proximity to an exit through the user wearing the wearable device departs to indicate a departure of the user wearing the wearable device from the facility. Based on the generation of the second flag or resetting of the first flag, the user of the wearable device can be "clocked-out" of a scheduling system. In some embodiments, a time period can be specified that prevents generating the second flag or resetting the first flag until the time period has elapsed. For example, after the first flag is generated, if the user is detected as departing from the facility within the specified time period after the first flag is set, the computing device 230 can be prevented from generating the second flag or resetting the first flag. In some embodiments, if a user is detected as departing during the specified time period, and is not detected as arriving again within another specified time period, the computing system 230 can generate the second flag or reset the first flag and associate a time stamp with the second flag or the resetting of the first flag corresponding to the time the user was detected as departing from the facility.

The computing system can grant access and unlock one or more electronic devices in the facility to allow the user to use the one or more electronic devices in response to detecting the arrival of the user wearing one of the wearable devices 210 and/or can restrict access and lock the one or more electronic devices in response to detecting the departure of the user wearing one of the wearable devices 210 from the facility. For example, receipt of the transmission from the wearable device by one or more of wireless receivers can cause the computing system to automatically log the user of the wearable device into computing devices that the user will use during a work shift (e.g., electronic terminals, portable devices, etc.).

In some embodiments, the electronic devices can implement a multi-factor authentication process (e.g., a two-step authentication process) and the computing system 230 can initiate a multi-factor authentication process using the received unique identifier to provide the electronic device with an authentication code as one factor for authenticating the user before allowing the user to access and operate one or more electronic terminals in the facility. Other factors that can be used in the multi-factor authentication process can be, for example, a password, reading a machine-readable element or a magnetic stripe including a unique identifier that is different than the unique identifier transmitted by the wearable device, and like. For example, one of the wireless transceivers 220 can be dedicated to a specific electronic device such that when the wireless transceiver receives a wireless transmission from one of the wearable devices 210, the wireless transceiver sends the unique identifier to the computing system 230, which determines whether the unique identifier should permit the user to access and operate the electronic device. If so, the computing system 230 can provide the electronic device with an authentication code to satisfy one of the authorization factors.

After flags or parameters are set to indicate the presence of users of the wearable devices 210, the computing system 230 can track locations of the wearable device 210 in the facility to determine locations of the users. For example, when a user is positioned at a specific location within the facility some of the wireless transceivers 220 can be in range of transmissions from the wearable device of the user such that these wireless transceivers received the transmission and some of the wireless transceivers 220 can be out of range of the transmission such that these wireless transceivers do not receive the wireless transmissions. Based on the locations of the wireless transceivers that receive the transmissions in the facility and the unique identifier included in the transmission, the computing system can estimate a location at which the wearable device that sent the transmission is disposed. For example, in response to a different subset of the wireless transceiver receiving the unique identifier and the acceleration data subsequent to the computing system 230 setting the first flag, the computing system is configured to determine a second location of the user based on the subset of the wireless transceivers that receive the transmissions and a signal strength of received wireless transmissions from the at least one wearable device. The wireless transceivers that receive the transmissions from the wearable device can determine signal strengths at which the transmission was received and the computing device can use the signal strengths to triangulate the estimated location of the wearable device.

In some embodiments, the computing system 230 can track a user location based on the unique identifier and the acceleration data received by one or more of the wireless transceivers 220, e.g., subsequent to the computing system setting the first flag. As one example, receipt of the acceleration data can also be used to track a relative location of the wearer and the physical steps taken by the wearer. For example, the quantity of steps taken by an employee wearing the wearable device can be monitored and tallied for a task being performed by the employee, and this information can be used to determine how the movement of the employee throughout the facility can be modified to improve performance. As another example, upon setting the first flag, the computing system 230 can determine that the user of the wearable device is located near the entrance of the facility. Upon receiving subsequent transmissions including the unique identifier and acceleration data, the computing system is configured to estimate a second location of the user of the wearable device based on an aggregation of the acceleration data. For example, the computing system 230 can estimate that the user is at the second location based on its relative location to the first location and the accumulated x, y, and z acceleration data between the first location and the second location.

In addition to estimating a location of the user of the wearable device, the computing system can determine tasks being performed by the user of the wearable device, a status of the task being performed by the user of the wearable device (e.g., started, in process, completed), and/or other parameters associated with tasks being performed by the user of the wearable device in response to receipt of the acceleration data by at least one of the wireless transceivers from the wearable device and a duration over which the wireless transceiver(s) receive the acceleration data.

The computing system 230 can be configured to transmit data/information to the wearable devices 210 via the wireless transmitters of the wireless transceivers 220. For example, the computing device 230, and subsequently, wireless transmitters of the wireless transceivers 220 can transmit a unique identifier associated with one of the wearable devices 210 and a description of a task, e.g., in response to the first flag being set by the computing system 230. Upon receipt of the transmission by the wearable device associated with the unique identifier, the controller of the wearable device can render a description of the task on the display of the wearable device.

For embodiments in which the wearable devices 210 include heart monitors, the controllers of the wearable device can wirelessly transmits heart-rate data output from the heart rate monitor with the unique identifiers and the acceleration data. The heartrate data can be used to determine whether users are currently wearing the wearable devices 210 (e.g., when no heartrate is detected, the computing system can determine that a user is not wearing the wearable device), and can be used to determine levels of energy being exerted by the users in performing tasks.

In exemplary embodiments, during the time a user is clocked in, until the user is clocked out and departs from the facility after their shift, the computing system can track an attendance, a location of the user, and a quantity of steps taken by the user as the employee is assigned and performs tasks, By tracking the location, the task, and the quantity of steps that a task should take (while averaging that task's time to completion for a given time period), the computing system 230 can determine that a user is taking longer than anticipated to complete a task and/or can identify appropriate users for tasks requiring different levels of physical exertion, determine which employees should be given more or less tasks during a shift, and/or can generate paths in the facility that the wearer of the wearable device should follow to complete tasks more efficiently and timely (e.g., by identifying paths through the facility that require less steps to complete tasks). In some embodiments, the paths generated by the computing system can be dependent on a frequency of the task and a number of steps required for completion. For example, a location and quantity of steps of the user of a wearable device can be tracked as the user performs a task (e.g., unloading trucks from the back, bringing pallets to unload to the front of the store and unloading and facing stock), and the computing system 230 can use this data to determine the shortest path for the associate to travel when certain item types (e.g. dairy or electronics) arrive and ultimately how, where and when items are placed onto shelves.

The computing system 230 can add user-specific reminders to the wearable devices 210 via transmissions through the wireless transceivers. Reminders programmed into the wearable devices 210 can cause the wearable devices energize the vibrating motor in the wearable device 210 to vibrate. As an example, the computing system 230 can load a reminder onto a wearable device such that when the user's break time is due, the wearable device worn by the user can vibrate to alert the wearer that it is time for the wearer to take a break. In exemplary embodiments, different vibration patterns can be programmed into the wearable devices for different reminders. For example, when a specific vibration pattern can be used to alert a wearer, with the least amount of steps taken for an identified period of time as compared to other wearers, that the next available task will be assigned to him/her (e.g. unloading a specific pallet).

By tracking and calculating the location and number of steps taken for a particular task, for all wearers of the wearable device in a facility, the computing system 230 can determine what tasks each wearer is working on. After identifying the tasks being performed, the computing system 230 can aggregate the number of steps taken for each wearer and determine a status of the task (e.g., how deep the wearers are into their respective tasks). When a new unplanned task needs to be added (e.g., a customer request or happenstance that needs attention), based on the tracked location, number of steps, and status of tasks, the computing system 230 can identify which wearer of the wearable device should be identifier for performing the unplanned task, and can add the new task to the wearer's task. In some embodiments, new tasks can be added to the wearer's task based on a proximity to the location at which the task is to be performed and a status of their current prioritized tasks. In some embodiments, the computing system can notify a manager (e.g., via a portable device carried by the manager or a wearable device worn by the manager) of the unplanned task and which wearer should be assigned to the unplanned task. If a wearer is reassigned to an unplanned task while performing another task, another wear of a wearable device can be assigned to complete the task in order of priority. In some embodiments, a message can be sent to the wearer to be assigned a new task.

In exemplary embodiments, messages can be sent from to and from wearable devices. As one example, a facility can include a customer interface 250 that allows a customer to post a question or a request to wearers of the wearable devices in the facility and one or more of the wearers can respond to the question (e.g., either by posting an answer to the customer interface 250 or by moving to the customer's location). In some embodiments, in response to the post or request, the computer system 230 can perform analytics on each wearer of the wearable device to determine their current location and a status of the tasks being performed by the wearers, and based on this analysis, the computing system can identify which of the wearer should receive a message via their wearable device to move to the location of the customer and assist the customer.

Figure 3:
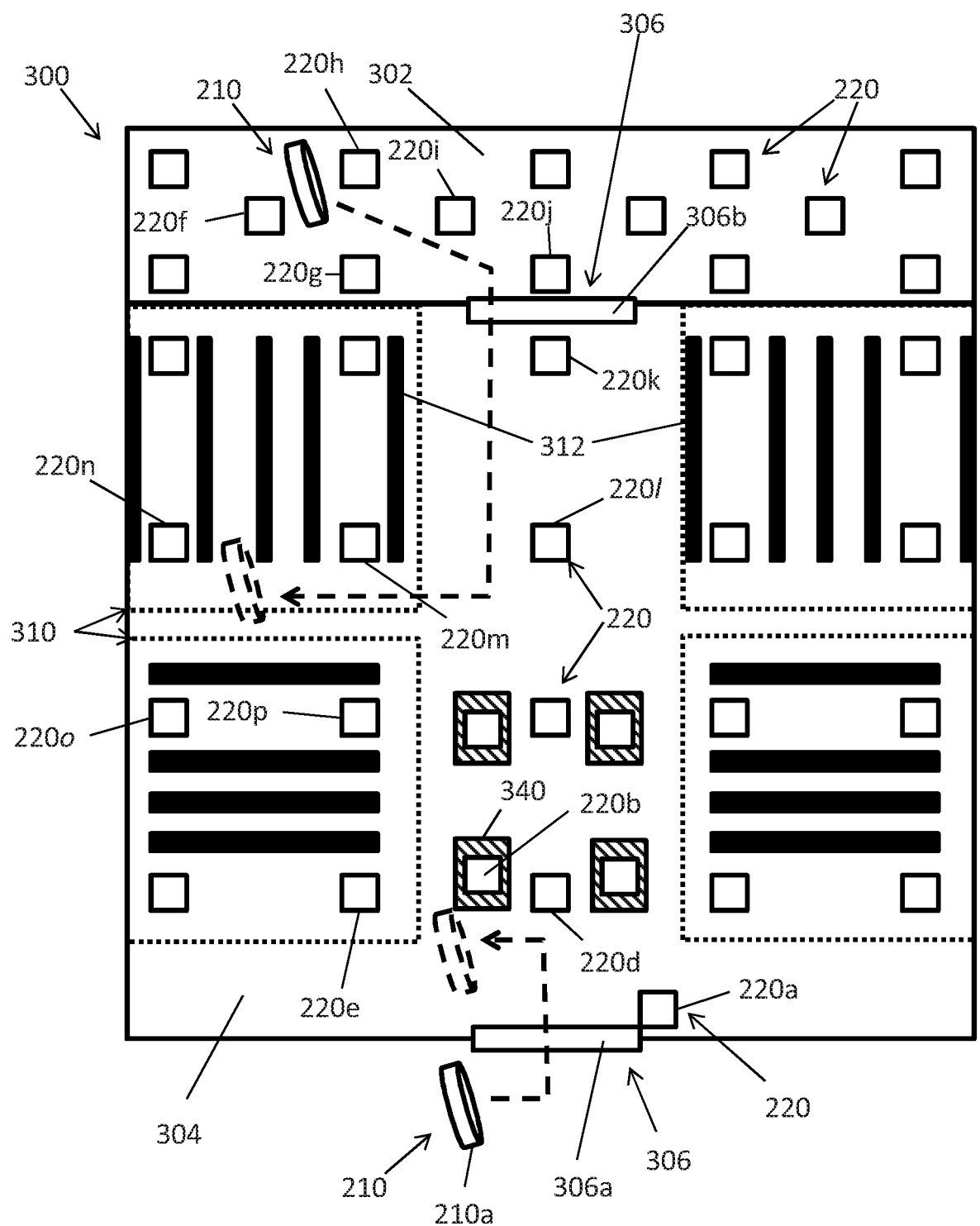
FIG. 3 is a schematic view of a facility in which embodiments of the distributed system can be implemented in accordance with the present disclosure.

FIG. 3 is a schematic view of a facility 300 in which embodiments of the distributed system can be implemented in accordance with the present disclosure. As shown in FIG. 3, the facility can have rooms 302 and 304. Wireless transceivers 220 can be distributed throughout the rooms 302 and 304. As one non-limiting example, the wireless transceivers 220 can be distributed to form a grid where the wireless transceivers are uniformly spaced from each other. Wireless transceivers 220 can also be disposed in proximity to entrances/exits 306 as well as in proximity to or integrated within electronic terminals 340. The facility 300 can include areas or departments 310 within which one or more structures, such as storage/display shelves 312 can be disposed. The shelves 312 can be configured to support or other hold physical objects.

Users in the facility 300 can wear wearable devices 210, which can be formed, for example as wristbands, as described herein. When users enter or approach the facility, one or more of the transceivers 220 can detect an wireless transmission from the wearable devices 210 worn by the users and can transmit a consent verification/authorization signal and data/information included in the wireless transmission to the computing system 230 (FIG. 2). In response to receipt of the data/information, the computing can perform one or more actions or operations, such as one or more actions or operations described herein.

As one example, a user wearing a wearable device 210a can enter the facility through an entrance/exit 306a. As the user walks into the facility 300 through the entrance/exit 306a, a transceiver 220a can detect a wireless transmission from the wearable device 210a. As described herein, the wireless transmission can include, for example, a unique identifier associated with the wearable device 210a, a consent verification/authorization signal, and/or acceleration data sensed by the accelerometer of the wearable device 210a (e.g., a quantity of steps taken by the user). The data/information received by the transceiver 220a can be transmitted to the computing system, which can determine whether the wearable device was previously detected by the transceiver 220a with a specified time period, and whether any flags have been set in memory to indicate the presence of the wearable device 210a at the facility or to indicate the departure of the wearable device 210a from the facility 300. In response to determining that the wearable device 210a is arriving at the facility 300, the computing system, based on the detection of the wearable device 210a by the transceiver 220a, can set a flag in memory to indicate that the user wearing the wearable device 210a has arrived at the facility and can log the user into one or more devices or systems at the facility.

As the user wearing the wearable device moves through the facility different subsets of the transceivers can detect wireless transmissions from the wearable device 210a. For example, the user may move towards and/or arrive at the electronic terminal 340, and transceivers 220b, 220c, 220d, and 220e can be within range of the wireless transmission, such that the transceivers 220b, 220c, 220d, and 220e can each receive the wireless transmission. The location of the wearable device 210a in the facility can be estimated by the computing system based on which of the transceivers 220 received the wireless transmission (e.g., transceivers 200b-e in the present example), a magnitude or power of the wireless transmission at which the transceivers 220b-e received the wireless transmission, and a location of the transceivers 220b-e. In addition, or in the alternative, the location of the wearable device 210a can be estimated based on the acceleration data received in wireless transmissions received by the transceivers 220. For example, the computing system can receive the acceleration data from the transceiver 220a when the user wearing the wearable device 210a enters the facility through the entrance 306a and can continue to receive acceleration data from the wearable device 210a as the user wearing the wearable device 210a moves through the facility (e.g., as received via the transceivers 220b-e). The computing system can accumulate and/or aggregate the acceleration data to determine the location of the user. For example, the computing system can set the acceleration data received as the user enters the facility 300 to be an origin and can determine the location of the user relative to the origin based on the acceleration data received by the computing system. In some embodiments, the computing system can use the acceleration data in combination with which of the transceivers 220 received the wireless transmission, a magnitude or power of the wireless transmission at which the transceivers 220b-e received the wireless transmission, and a location of the transceivers 220b-e to estimate a location of the wearable device 210a.

When the user arrives at the electronic terminal 340 such that the transceiver 220b receives a wireless transmission from the wearable device 210a, the electronic terminal 340 can initiate a log in process and can use the unique identifier included in the wireless transmission as an authentication parameter for allowing the user to access and operate the electronic terminal 340. The user may then enter additional authentication parameters into the electronic device 340 via a user interface before access is granted to the user. In response to receiving the wireless transmission via the transceiver 220a and receiving input from the user via the electronic terminal 340, the computing system can autonomous determine a task being performed by the user and whether that task corresponds to one or more tasks assigned to the user.

When the user wearing the wearable device 210a moves away from the electronic terminal 340, such that the transceiver 220b no longer receives wireless transmission from the wearable device 210a, the electronic device 340 can log the user out or otherwise lock the access and/or operation of the electronic terminal. In response to no longer receiving wireless transmissions via the transceiver 220a, the computing system can autonomous determine a task being performed by the user is complete or on hold.

As another example, a user wearing a wearable device 210b can be in the room 302, and transceivers 220f-g can receive wireless transmissions from the wearable device 210b. The location of the wearable device 210b in the facility 300 can be estimated based on the acceleration data received in the wireless transmissions, which of the transceivers 220 received the wireless transmission, a magnitude or power of the wireless transmission at which the transceivers 220f-g received the wireless transmission, and/or a location of the transceivers 220f-g to estimate a location of the wearable device 210a. Upon receiving wireless transmissions from the wearable device 210b (via the transceivers 220f-g), the computing system can determine what task is being performed by the user. The computing system can determine a task being performed by the user wearing the wearable device 210b based on the location of the wearable device 210b, a duration that the wearable 210b remains in the location, acceleration data (e.g., a quantity of steps taken by the user) received by the computing system, a time of day when the user is at the location, a list of tasks assigned to the user for a specified time period, and the like. For example, a number of tasks can be assigned to a user for an eight hour period and a prioritized order can be applied to the tasks such that certain tasks should be completed before other tasks. The computing system can estimate a time period required to complete each task. The computing system can determine whether the wearable device 210b is a location associated with one or more of the tasks to be completed for a specified period of time, and can determine that based on the location and the assigned, prioritized tasks, the user is performing a given one of the tasks. In addition, or in the alternative, the user can enter an input into the wearable device 210b to indicate which task the user is performing when the user starts the task.

As the user performs the task, the user may move through the facility 300. For example, the user may be in the room 302 and may move through the entrance/exit 306b to the room 304, and to the through the entrance/exit 306a to one or more of the areas or departments 310. For example, the user may be moving physical objects from the room 302 to one or more of the storage/display shelves 312 in one or more of the areas or departments 310 within which one or more storage/display shelves 312 are disposed. The user may have to move back and forth between the room 302 and the room 304 several terms during the task and may take one or more paths. The computing system can track the one or more paths taken by the user as the user moves between the room 302 and the 304 based on the acceleration data included in wireless transmissions from the wearable device 210b, which of the transceivers 220 receive the wireless transmissions, a magnitude or power of the wireless transmissions at which the transceivers 220 receive the wireless transmissions, and locations of the transceivers 220 that receive the wireless transmissions. For example, the user may move from the room 302 to the room 304 along a path 308 such that as the user moves along the path 308 different subsets of transceivers 220e-p can receive wireless transmissions based on the location of the wearable device 210b and the transceivers 220e-p.

After the computing device determines that a task has been initiated, the computing device can track the acceleration data in the wireless transmissions from the wearable device 210b to determine status of the task as well as an efficiency with which the task is being performed. For example, the computing system can maintain a quantity of steps taken by the user since the task was started and can estimate a percent completion of the task based on the quantity of steps taken. In exemplary embodiments, the computing system can access a database based on the task being performed to retrieve an estimated total quantity of steps required to complete the task, and can compare the current quantity of steps taken by the user with the estimated total quantity of steps required to complete the task, and can determine the status of the task based on a ratio between the current quantity of steps taken and the estimated total quantity of steps required. The computing device can determine that a task has been completed based on the quantity of steps taken by the user during the task, a location of the user that deviates from an expected location of the user while performing the task, and/or if the computing device determines that the user has started a new task.

Figure 4:
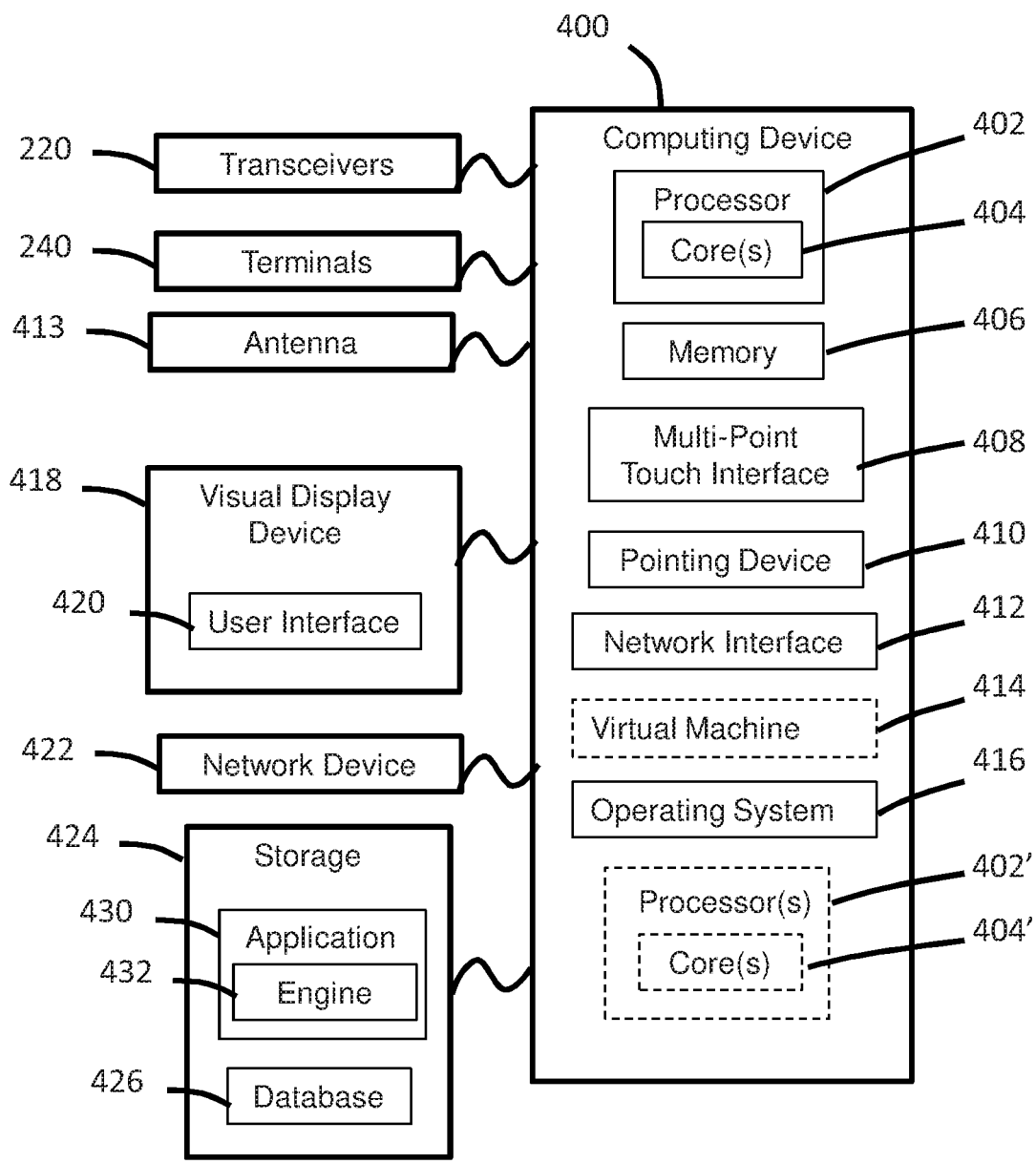
FIG. 4 is an exemplary computing device for implementing embodiments of the present disclosure.

FIG. 4 is an exemplary computing device 400 for implementing embodiments of the present disclosure. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 406 included in the computing device 400 may store computer-readable and computer-executable instructions or software (e.g., applications 430, such as user tracking and communication engines 432) for implementing exemplary operations of the computing device 400 and performing one or more processes associated with embodiments of the distributed system including processes implemented by embodiments of the computing system 230 shown in FIG. 2. The computing device 400 also includes configurable and/or programmable processor 402 and associated core(s) 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for implementing exemplary embodiments of the present disclosure. Processor 402 and processor(s) 402' may each be a single core processor or multiple core (404 and 404') processor. Either or both of processor 402 and processor(s) 402' may be configured to execute one or more of the instructions described in connection with computing device 400.

Virtualization may be employed in the computing device 400 so that infrastructure and resources in the computing device 400 may be shared dynamically. A virtual machine 412 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

The computing device 400 can receive data from the transceivers 220, electronic terminals 340, as well as other networked device. An operator may interact with the computing device 400 through a visual display device 414, such as a computer monitor, which may display one or more graphical user interfaces 416, multi touch interface 420 and a pointing device 418.

The computing device 400 may also include one or more storage devices 426, such as a hard-drive, CD-ROM, or other computer readable media, for storing data and computer-readable instructions and/or software that implement exemplary embodiments of the present disclosure (e.g., user tracking and communication engines 432). For example, exemplary storage device 426 can include one or more databases 428 for storing information regarding data/information received from wearable device via the transceivers 220, tasks associated with users of the wearable device, statuses of the tasks being performed by the users, presence and departure of the users, metrics associated with completed tasks, and the like. The databases 428 may be updated manually or automatically at any suitable time to add, delete, and/or update one or more data items in the databases.

The computing device 400 can include a network interface 408 configured to interface via one or more network devices 424 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the computing system can include one or more antennas 422 to facilitate wireless communication (e.g., via the network interface) between the computing device 400 and a network and/or between the computing device 400 and other computing devices (e.g., transceivers 220). The network interface 408 may include a built-in network adapter, network interface card, PCMCIA network card, card bus network adapter, wireless network adapter, USB network adapter, modem or any other device suitable for interfacing the computing device 400 to any type of network capable of communication and performing the operations described herein.

The computing device 400 may run any operating system 410, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device 400 and performing the operations described herein. In exemplary embodiments, the operating system 410 may be run in native mode or emulated mode. In an exemplary embodiment, the operating system 410 may be run on one or more cloud machine instances.

Figure 5:
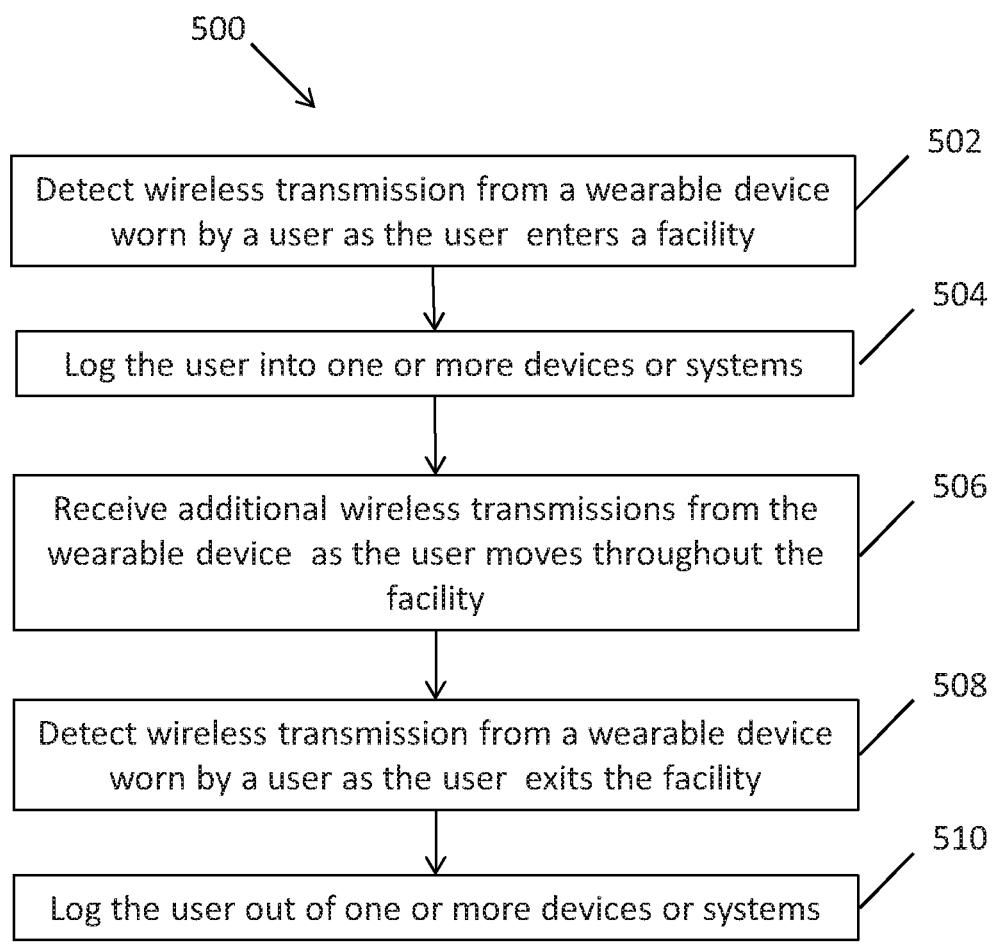
FIG. 5 is a flowchart illustrating a process implemented in a user tracking and communication environment in accordance with embodiments of the present disclosure.

FIG. 5 is a flowchart illustrating a process 500 implemented in a user tracking and communication environment for responding to arrivals and departures of users that have provided consent which has been verified in accordance with embodiments of the present disclosure. At step 502, a user wearing a wearable device (e.g., wearable device 210 shown in FIG. 2) arrives at the facility and enters the facility through a door. The computing system executing the user tracking and communication engine can detect the user's presence based on receipt of a wireless transmission from the user's wearable device by a transceiver disposed proximate to the door. At step 504, the user is automatically logged in to a computing system and/or logged in to one or more electronic terminals or devices in the facility and is authorized for access to specified areas of the facility by the computing system. At step 506, additional wireless transmissions are detected from the user's wearable device as the user moves throughout the facility. For example, user metrics/details (e.g., user location, acceleration data, etc.) included in the wireless transmissions from are received by transceivers distributed throughout the facility and are forwarded to the computing system.

The computing system can identify user's that have been logged into the computing system based on detecting their wearable devices and can assign tasks to the user based on the location of the user, the role of the user, the duration the user is expected to be in the facility, the types of tasks available, a quantity of users in the facility, user details associated with other users in the facility, and the like. The wearable device of the user receives a message from the computing system (e.g., via the transceivers) notifying the user of a task start location and required task to be completed. A manager can interact with the computing system via a manager's wearable device, an electronic terminal, a hand-held electronic device, and/or any other suitable device to update or modify tasks assigned to or being assigned to the users. The manager can receive notifications and reports for all users logged in to the computing system via their wearable devices. In some embodiments, the reports can include available tasking, assigned tasking, time to complete assigned tasks, user locations, time remaining for tasks to be completed, a number of users logged into the computing system via their wearable devices, and the like.

While the user is in the facility, the user can take a break (scheduled or unscheduled), and can interface with the wearable device to provide an input to indicate that the user should be logged off the computing system for break. When the user is on a break, the computing system can determine what task or task(s) have been or were going to be assigned to the user and can determine whether to reassign the task or tasks to other users based on an availability of other user, locations of other users, an anticipated duration of the break, an expected amount of time for completing the task or tasks, and the like. If the computing system determines to reassign the task or tasks, the computing system transmit messages to other users that have been logged in to the computing system via the wearable device to reassign the task or tasks to one or more users.

At step, 508 the user can leave the facility (e.g., at the end of their shift), and the computing system can detect that user has exited the facility. For example, wireless transmissions from the wearable device worn by the user can be received by one or more transceivers disposed proximate to the door. Upon determining the that user has exited the facility, at step 510, the computing system can log the user out of the computing system and/or can log the user out of electronic terminals or devices in the facility.

Figure 6:
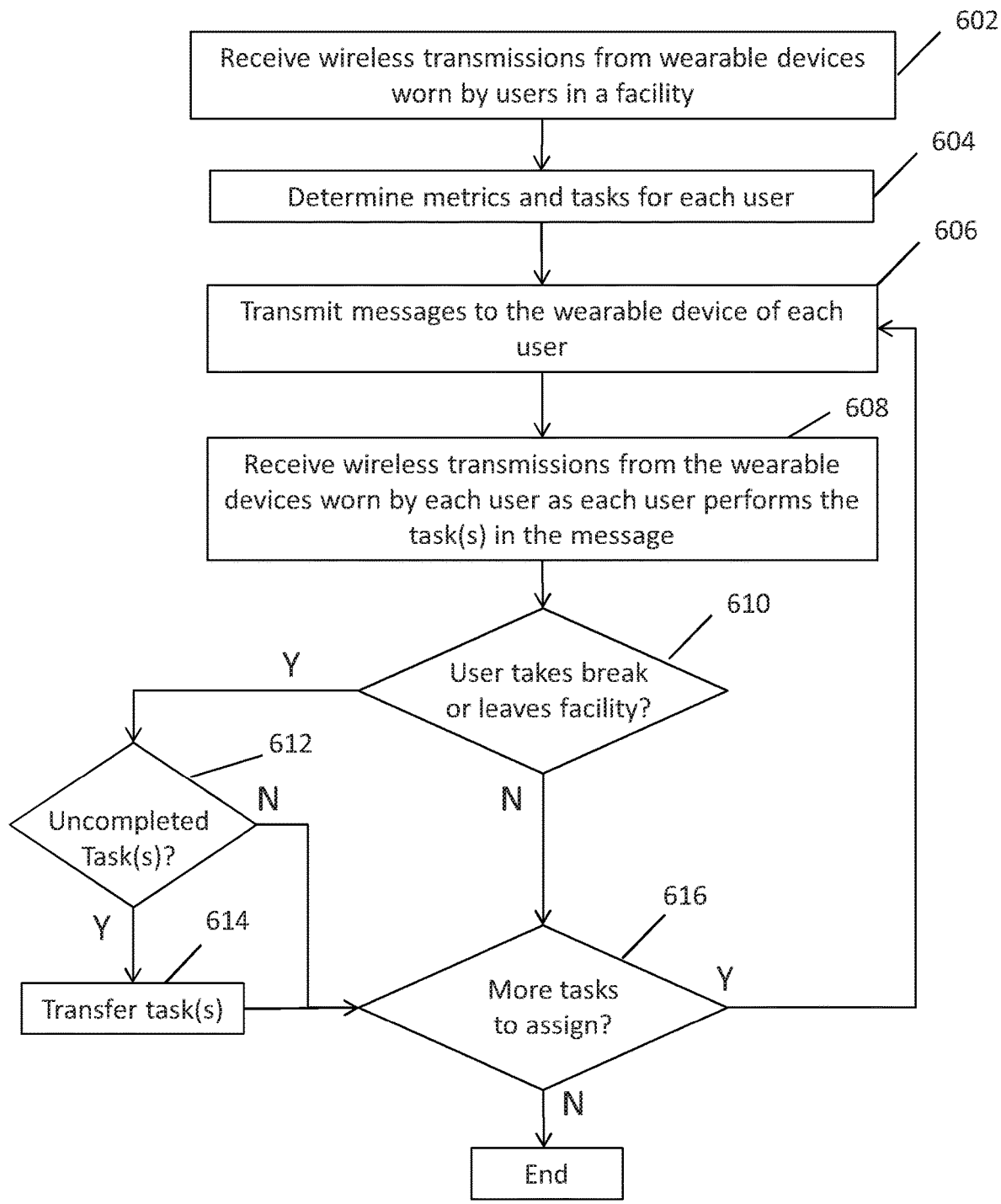
FIG. 6 is a flowchart illustrating a process implemented in a user tracking and communication environment for assigning tasks in accordance with embodiments of the present disclosure.

FIG. 6 is a flowchart illustrating a process 600 implemented in a user tracking and communication environment for assigning tasks to users that have provided consent which has been verified in accordance with embodiments of the present disclosure. At step 602, wireless transmissions can be received by a computing system from wearable devices worn by users. For example, wireless transmission from the wearable devices worn by the users can be received by one or more transceivers distributed through the facility and the one or more transceivers can transmit the data/information received in the wireless transmissions, directly or indirectly, to the computing system. The data/information included in each wireless transmission can include, for example, a unique identifier associated with the wearable device sending the wireless transmission and acceleration data (e.g., raw acceleration data output from the accelerometer of the wearable device or processed acceleration data, such a quantity of steps taken by the user of the wearable device). In some embodiments, the data/information can also include inputs from the user and/or any other suitable data/information.

At step 604, the computing system can individually and/or collectively determine metrics for the users wearing the wearable devices, can determine tasks being performed by the users, and/or can determine tasks to assign to the users based on the data/information received via the wireless transmissions and locations of the users. At step 606, the computing system can transmit messages to the wearable devices worn by the users. The messages can include one or more tasks to be performed by the users and/or can include other data/information for the users or to be processed by the wearable devices. The computing system can directly or indirectly send messages to one or more of the transceivers in the facility and the transceivers can broadcast messages. The messages can be received by the wearable devices that within range of the transmission from the transceivers. Each wearable device can determine whether a message is intended for it based on one or more identifiers included in the message. For example, the message can include a unique identifier associated with a specific wearable device such that the wearable device can determine that the message is intended for the wearable device based on the inclusion of the unique identifier in the message and other wearable device can determine that the message was not intended for them based on the absence of their unique identifier. In some embodiments, a message can be intended for all of the wearable device and/or a subset of the wearable devices. In such embodiments, the message can include a universal identifier that corresponds to all of the wearable device or to a specific subset of the wearable devices.

At step 608, wireless transmissions from the wearable devices worn by the users can be received by the computing system (e.g., via the transceivers) as each of the users performs their tasks. Each wireless transmission can include a unique identifier and acceleration data. A location of each wearable device can be determined based on the location of the one or more transceivers that receive the wireless transmission and a power of the wireless signal received at the one or more transceivers. Based on the acceleration data and the location of the wearable devices, the computing system can determine which tasks are being performed and/or a status of the tasks being performed (e.g., a percent completed, a duration of time over which the task is being performed, etc.). To determine the status of the task, the computing system can determine an estimated quantity of steps required to complete the task and/or an estimated duration of time required to complete the task, and can compare the quantity of steps taken by the user performing the task (e.g., from the estimated time the user started the task) to the estimated required steps and/or can compare the duration of time over which the user has been performing the task (e.g., from the estimated time the user started the task) to the estimated duration of time required to complete the task.

At step 610, the computing system determines whether a user wearing the wearable device has left the facility or has taken a break. If so, in some embodiments, at step 612, the computing device can determine whether the user was working on an open (uncompleted) task when the user left, and if so, at step 614, the computing system can transfer the task to another user in the facility based on the current location and task(s) assigned to the other user (e.g., by transmitting a message to the other user's wearable device assigning the task to the other user).

When the computing device determines that one or more users are or will be available to perform additional tasks, at step 616, the computing system can determine whether there are additional tasks to assign to the users. If so, the process 600 repeats from step 606. If not, the process ends.

Figure 7:
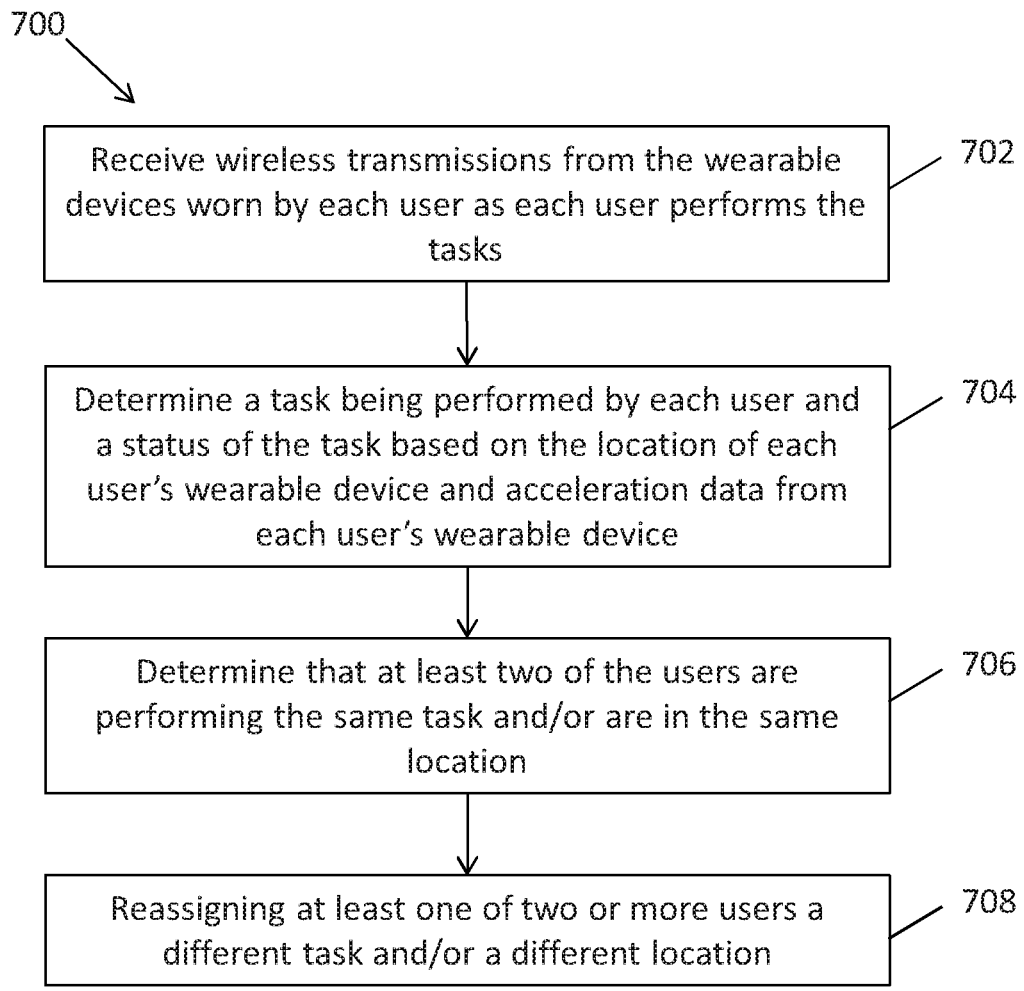
FIG. 7 is a flowchart illustrating a process implemented in a user tracking and communication environment for reassigning tasks in accordance with embodiments of the present disclosure.

FIG. 7 is a flowchart illustrating a process 700 implemented in a user tracking and communication environment for reassigning tasks to users that have provided consent which has been verified in accordance with embodiments of the present disclosure. As step 702, wireless transmissions can be received by a computing system from wearable devices worn by users. For example, wireless transmission from the wearable devices worn by the users can be received by one or more transceivers distributed through the facility and the one or more transceivers can transmit the data/information received in the wireless transmissions, directly or indirectly, to the computing system. The data/information included in each wireless transmission can include, for example, a unique identifier associated with the wearable device sending the wireless transmission and acceleration data (e.g., raw acceleration data output from the accelerometer of the wearable device or processed acceleration data, such a quantity of steps taken by the user of the wearable device). In some embodiments, the data/information can also include inputs from the user and/or any other suitable data/information.

As step 704, the computing device can determine a task being performed by each user and a status of the task based on the location of each user's wearable device and acceleration data from each user's wearable device. At step 706, the computing system can determine that at least two of the users are performing the same task and/or are in the same location. At step 708, the computing system can reassign at least one of two or more users a different task and/or to a different location. For example, the computing system can reassign the at least one of the two users based on a which of the users performing the same task and/or who are in the same location has completed less of the task (e.g., based on an estimated start time of each user and a quantity of steps taken by each user), based which of the at least one of the two users has taken more or fewer steps while in the facility, based on a scheduled departure time of the users, and the like.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A distributed system comprising:
a plurality of wearable devices, each of the plurality of wearable device comprising:
an accelerometer;
a wireless transmitter;
a controller operatively coupled to the accelerometer and the wireless transmitter, the controller being configured to receive acceleration data output from the accelerometer and to wirelessly transmit the acceleration data with a unique identifier; and
a band housing the accelerometer, the wireless transmitter, and the controller, the band being configured to be worn by a human;
a plurality of wireless receivers distributed throughout a facility, at least one of the plurality of wireless receivers configured to receive the acceleration data and the unique identifier wirelessly transmitted from at least one of the plurality of wearable devices in response to the at least one of the plurality of wireless receivers being within a transmission range of the at least one of the plurality of wearable devices;
a computing system operatively coupled to the wireless signal receivers, the computing system being configured to (i) generate a first parameter in a physical memory location indicating an arrival of the wearable device in response to receipt of the unique identifier and (ii) determine a status of a task being performed by the human in response to receipt of the acceleration data by the at least one of the plurality of wireless receivers and a duration over which the at least one of the plurality of wireless receivers receives the acceleration data; and
a computer terminal configured to receive the unique identifier transmitted from the at least one wearable device in response to the computing terminal being within a transmission range of the computer terminal, and to accept the unique identifier as a first step authentication code in a two-step authentication process to log on to the computer terminal,
wherein the computing system is configured to at least one of set a second parameter in a second physical memory location or reset the first parameter in the first physical memory location in response to the receipt of the unique identifier a second time by the at least one of the plurality of wireless receivers to indicate a departure of the human wearing the wearable device from the facility.

2. The distributed system of claim 1, wherein the computing system is configured to set the second parameter or reset the first parameter in response to receipt of the unique identifier the second time occurring after a time period as elapsed.

3. The distributed system of claim 1, wherein in response to receipt of the unique identifier wirelessly transmitted from the at least one of the plurality of wearable devices by the at least one of the wireless receivers, the computing system is configured to establish a first location of the at least one of the plurality of wearable devices.

4. The distributed system of claim 1, wherein in response to the plurality of wireless receivers receiving the unique identifier and the acceleration data subsequent to the computing system setting the first parameter, the computing system is configured to determine a second location of the human based on an aggregation of the acceleration data.

5. The distributed system of claim 1, wherein in response to a subset of the plurality of wireless receivers receiving the unique identifier and the acceleration data subsequent to the computing system setting the first parameter, the computing system is configured to determine a second location of the human based on the subset of the plurality of wireless receivers and a signal strength of received wireless transmissions from the at least one wearable device.

6. The distributed system of claim 1, further comprising a plurality of wireless transmitters geographically distributed throughout a facility,
wherein the plurality of wireless transmitters are configured to wirelessly transmit the unique identifier and a description of the task to the at least one wearable device in response to the first parameter being set by the computing system, and
wherein the at least one wearable device comprises:
a wireless receiver operatively coupled to the controller to receive the unique identifier and the description of the task; and
a display embedded in the carrier and operatively coupled to the controller, the display being controlled by the controller to render the description of the task on the display.

7. The distributed system of claim 1, wherein the at least one wearable device comprises a heart rate monitor, and the controller wirelessly transmits heart-rate data output from the heart rate monitor, and the computing system is configured to determine a level of energy exerted by the human in performing the task.

8. The distributed system of claim 1, wherein the carrier housing the accelerometer, wireless transmitter, and controller comprises a wristband.

9. The distributed system of claim 1 wherein a second step authentication code includes at least one of a password, a reading of a machine readable element, a magnetic stripe including a unique identifier different than the unique identifier transmitted from the at least one wearable device.

10. A wearable device comprising:
a wristband having a body formed of one or more flexible straps; and
circuitry embedded in the wristband, the circuitry comprising:
an accelerometer;
a wireless transceiver;
a display; and
a controller operatively coupled to the accelerometer, the wireless transceiver, and the display, the controller being configured to (i) receive, via the wireless transceiver, a wireless transmission including a unique identifier associated with the wristband and a description of a task to be performed by a wearer of the wristband, wherein the unique identifier transmitted from the at least one wearable device comprises a first step authentication code in a two-step authentication process to log on to a computer terminal, (ii) render the description of the task on the display, (iii) receive acceleration data output from the accelerometer, (iv) wirelessly transmit the acceleration data with the unique identifier, wherein the acceleration data is indicative of a status of a task (v) in response to actuation of the switch when the description of the task is rendered on the display, reset a first physical memory location at which the acceleration data is stored, and (vi) in response to the first physical memory location being reset, store contemporaneously generated acceleration data in the first physical memory location and associate the contemporaneously generated acceleration data with the task.

11. The wearable device of claim 10, further comprising a heart rate monitor, wherein, in response to actuation of the switch when the description of the task is rendered on the display, the controller is configured to determine a level of energy exerted by the wearer of the wristband while performing the task.

12. The wearable device of claim 10, wherein a second step authentication code includes at least one of a password, a reading of a machine readable element, a magnetic stripe including a unique identifier different than the unique identifier transmitted from the at least one wearable device.

13. A method in a distributed system, the method comprising:

receiving a first wireless transmission from a wearable device by a first wireless receiver, the first wireless transmission including a unique identifier, wherein the unique identifier transmitted from the wearable device comprises a first step authentication code in a two-step authentication process to log on to a computer terminal;

generating a first parameter in a first physical memory location in response to the receipt of the unique identifier, the first parameter indicating an arrival of the human wearing the wearable device;

receiving, subsequent to the computing system setting the first parameter, a second wireless transmission from the wearable device by a second wireless receiver, the second wireless transmission including the unique identifier and acceleration data; and receiving additional wireless transmissions from the wearable device, the additional wireless transmissions including the unique identifier and the acceleration data;

determining a status of a task being performed by the wearer of the wearable device based on at least the acceleration data received in the additional wireless transmissions, the second wireless receiver that receives the additional wireless transmissions, and a duration over which the second wireless receiver receives the additional wireless transmissions; and setting a second parameter in a third physical memory location in response to the receipt of the unique identifier a second time by the first wireless receiver to indicate a departure of the wearer of the wearable device.

14. The method of claim 13, further comprising:

resetting a second physical memory location at which the acceleration data is stored in response to receipt of the first wireless transmission by the first wireless receiver;

storing the acceleration data in the second wireless transmission at the second physical memory location;

determining a second location of the wearable device based on the acceleration data in the second wireless transmission.

15. The method of claim 14, further comprising:

resetting the second physical memory location in response to receipt of the second wireless transmission by the second wireless receiver; and storing the acceleration data in the additional wireless transmissions at the second physical memory location.

16. The method of claim 13 wherein a second step authentication code includes at least one of a password, a reading of a machine readable element, a magnetic stripe including a unique identifier different than the unique identifier transmitted from the at least one wearable device.

* * * * *